United States Patent
Chiarin

(10) Patent No.: US 8,168,099 B2
(45) Date of Patent: May 1, 2012

(54) INJECTION MOLDING PROCESS FOR MAKING LABORATORY TEST-TUBES AND MOLD TO BE USED IN THE MOLDING PROCESS THEREOF

(75) Inventor: Renzo Chiarin, Arzergrande (IT)

(73) Assignee: Vacutest Kima S.r.L., Arzergrande, Padua (IT)

(*) Notice: Subject to any disclaimer, the term of this patent is extended or adjusted under 35 U.S.C. 154(b) by 127 days.

(21) Appl. No.: 12/832,192

(22) Filed: Jul. 8, 2010

(65) Prior Publication Data

US 2010/0314802 A1    Dec. 16, 2010

Related U.S. Application Data

(63) Continuation-in-part of application No. 11/910,782, filed as application No. PCT/IB2006/000990 on Apr. 4, 2006, now abandoned.

(30) Foreign Application Priority Data

Apr. 6, 2005 (IT) .............................. PD2005A0091

(51) Int. Cl.
*B29C 45/34* (2006.01)
(52) U.S. Cl. ................... 264/102; 264/328.12; 425/546; 425/812

(58) Field of Classification Search ............... 264/102, 264/328.1, 328.12; 425/546, 577, 812
See application file for complete search history.

(56) References Cited

U.S. PATENT DOCUMENTS

| | | | |
|---|---|---|---|
| 2,434,594 A | 1/1948 | Schultz | |
| 4,126,291 A | 11/1978 | Gilbert et al. | |
| 5,376,313 A | 12/1994 | Kanewske, III et al. | |
| 5,843,485 A | 12/1998 | Fernandez et al. | |
| 6,367,765 B1 | 4/2002 | Wieder | |
| 6,561,779 B2* | 5/2003 | Nitsch et al. | 425/812 |
| 7,481,642 B2* | 1/2009 | Niewels | 425/812 |
| 2004/0265453 A1 | 12/2004 | Helou, Jr. et al. | |

FOREIGN PATENT DOCUMENTS

| | | |
|---|---|---|
| JP | 01202417 | 8/1989 |
| JP | 04135820 | 5/1992 |

* cited by examiner

*Primary Examiner* — Jill Heitbrink
(74) *Attorney, Agent, or Firm* — Shoemaker and Mattare

(57) ABSTRACT

A laboratory test tube is formed between male and female mold elements by injection of molten plastic material. The female element has a bottom element formed by first and second alternating complementarily shaped wedges. At least the second wedges are able to move under the pressure of the molten plastic from a rest position to an operative position in order to form slits which allow air, but not molten plastic, to exit from the mold.

20 Claims, 8 Drawing Sheets

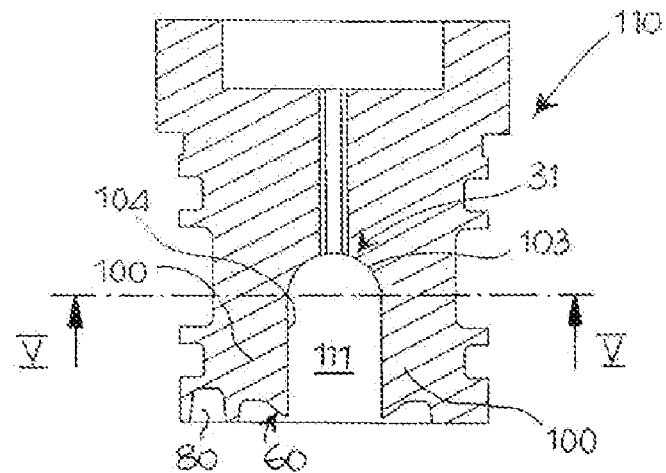
Fig.4
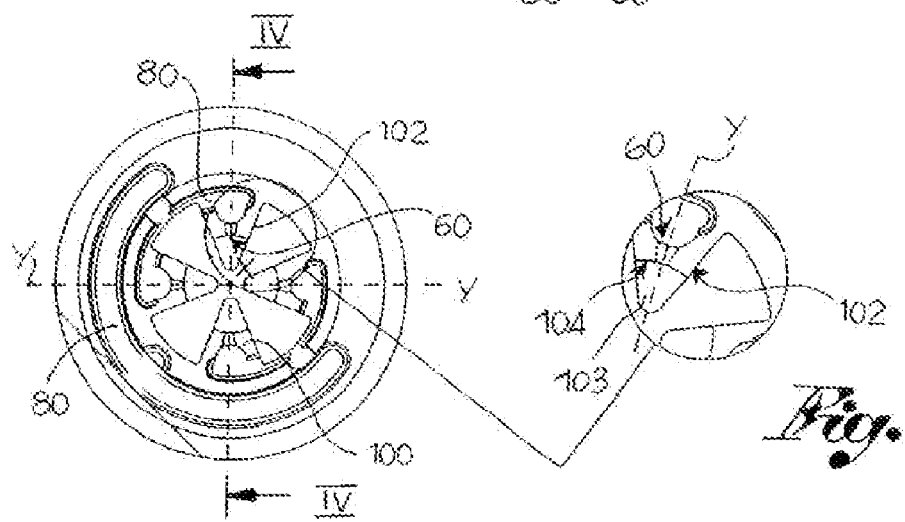
Fig.3a
Fig.3
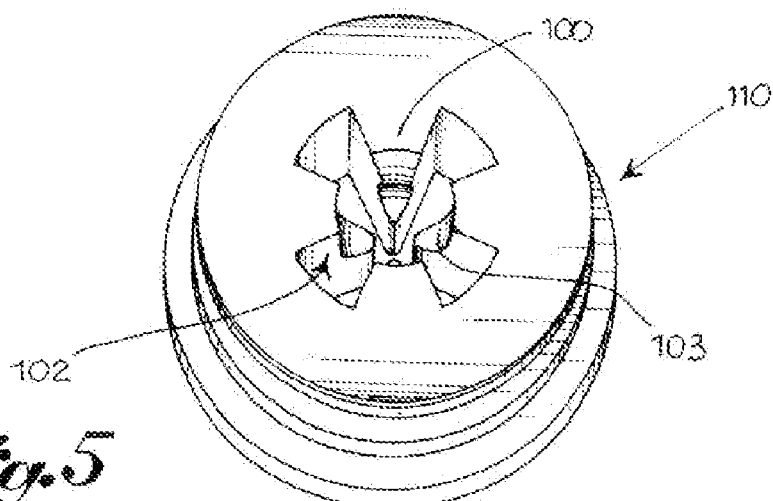
Fig.5

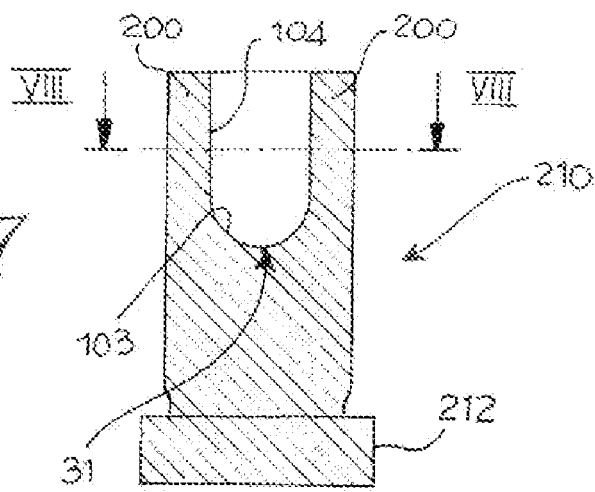
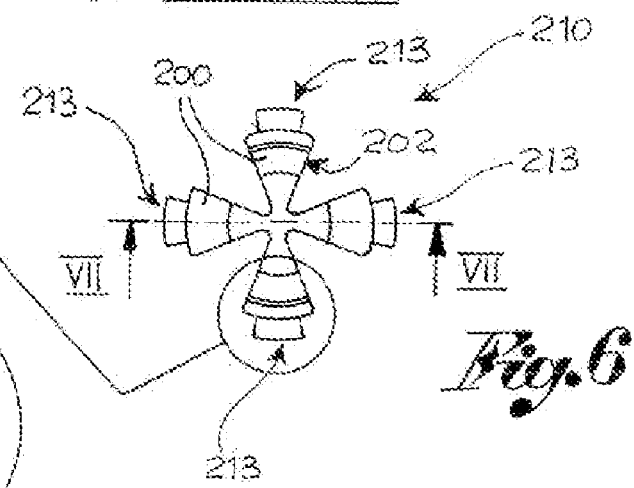
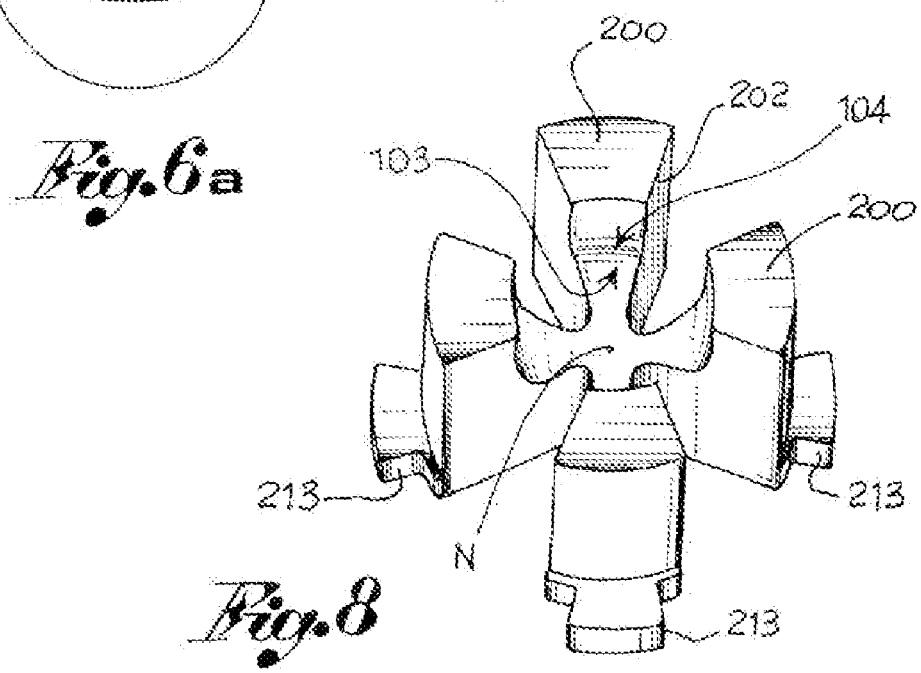

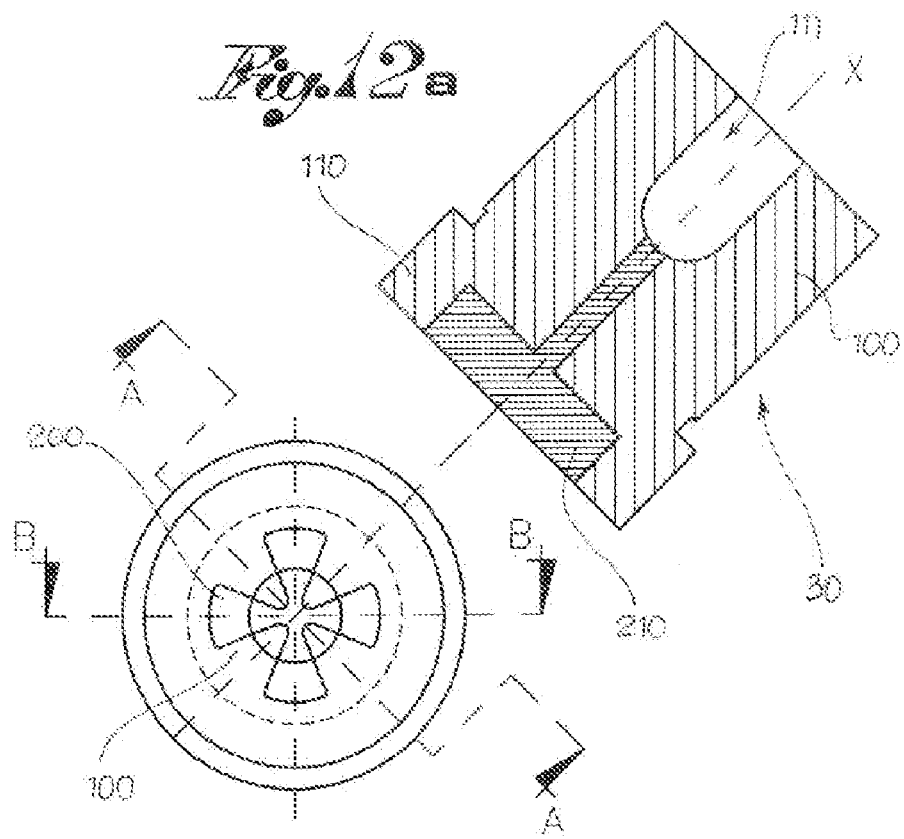
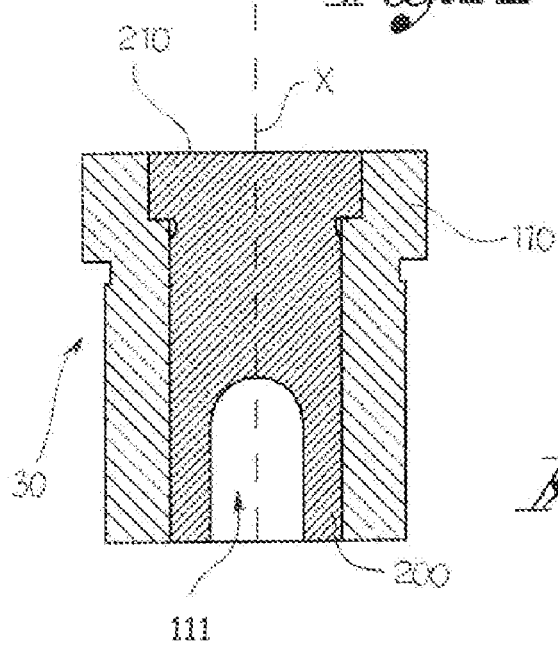

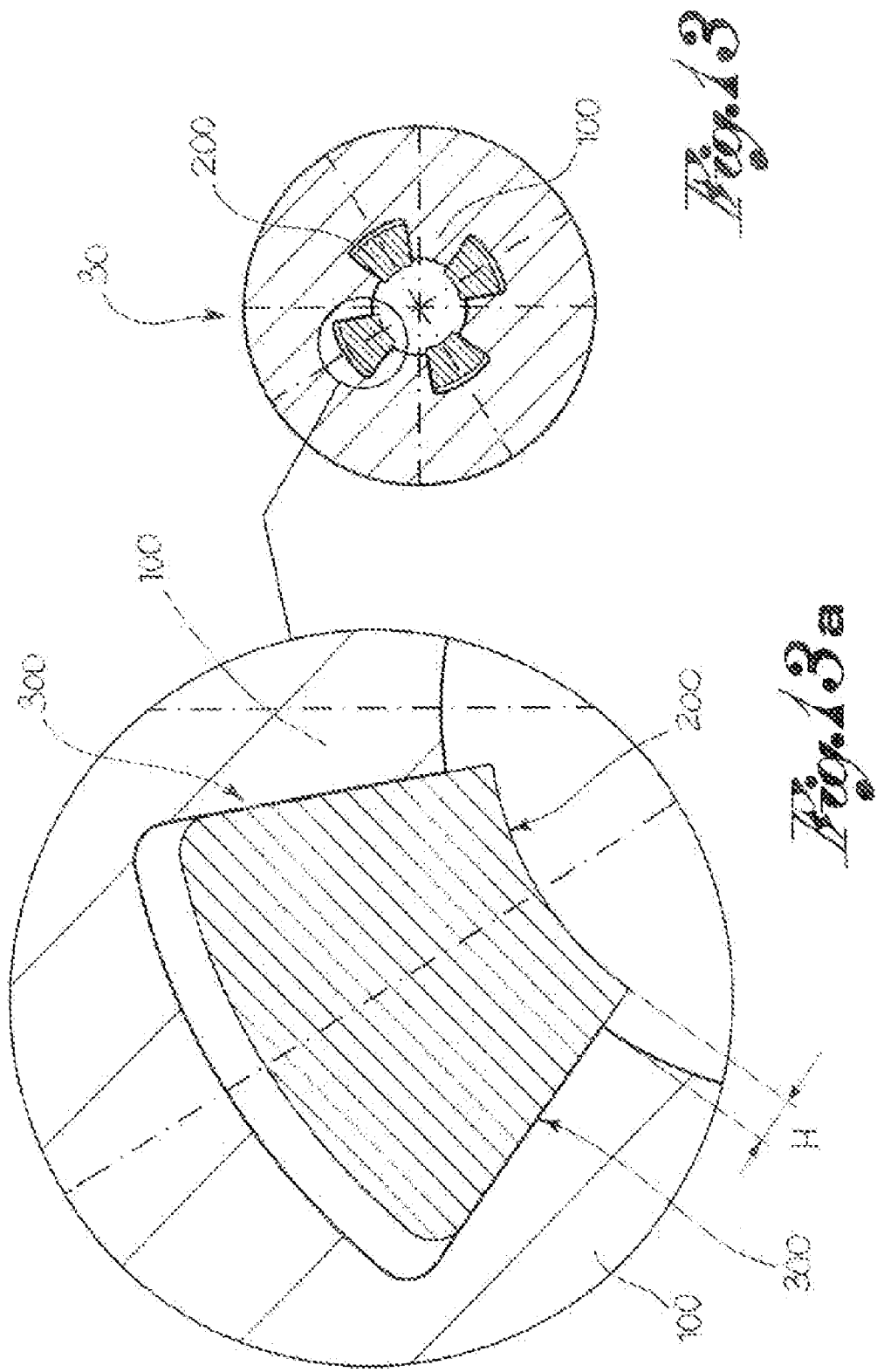

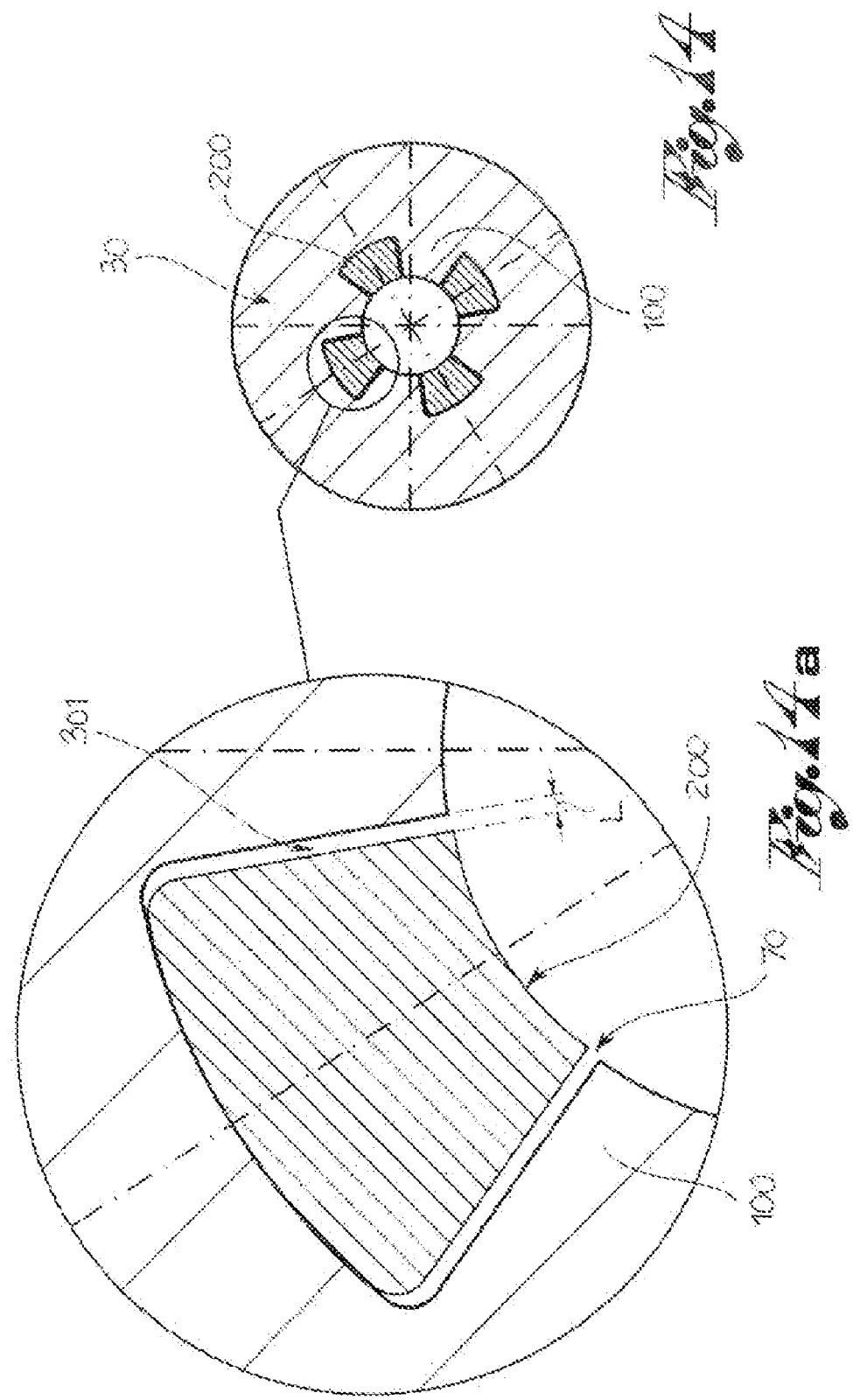

INJECTION MOLDING PROCESS FOR MAKING LABORATORY TEST-TUBES AND MOLD TO BE USED IN THE MOLDING PROCESS THEREOF

This application is a continuation-in-part of copending application Ser. No. 11/910,782, filed Nov. 6, 2007, which is the U.S. national stage of international application PCT/IB2006/000990, filed Apr. 4, 2006.

FIELD OF THE INVENTION

The present invention refers to a process for the injection molding of plastic materials to make laboratory test tubes and to a mold usable in such process.

The molding process and the mold subject of the present invention can be advantageously used in producing test tubes, pipettes and like plastic containers generally for clinical use, and more particularly adapted for use in clinical tests to measure a blood sample's erythrocyte sedimentation rate (ESR).

BACKGROUND OF THE INVENTION

As is known, in the field of chemical analysis of body fluids, particularly by means of automatic analytical tools, there exists the particular need to have test tubes, pipettes or other like containers with containment side walls which are perfectly aligned with the longitudinal extension axis of the test tube itself and have a constant thickness along the entire axis.

This need is particularly important, for example, in the tests for measuring a blood sample's erythrocyte sedimentation rate (ESR). As is known, in fact, the erythrocyte sedimentation process is strongly influenced by the shape of the side walls of the test tube which is used to contain the blood sample to be analysed. In fact, if the test tube has an internal cross-section which is not perfectly constant and, thus, internal walls not perfectly aligned relative to its longitudinal extension axis, the erythrocytes inevitably tend to deposit themselves on the internal walls of the test tube itself, thus slowing their sedimentation movement toward the bottom. The ESR values obtained from measurements carried out in such test tubes shall result, therefore, misrepresented and unreliable. In the tests for measuring the ESR the need to have test tubes with side walls having a perfectly constant thickness is not connected per se to the process of erythrosedimentation, but to the appearance of optical type, automatic measuring tools. These tools are calibrated depending on the thickness of the test tube's side walls, since the measurement they give also depends on the optical path of the reading rays through the walls. Therefore, possible irregularities in the thickness of the walls, by modifying the optical path of the rays, can cause the automatic reading tool to provide measurement values outside the calibration range and therefore unreliable.

As is known, the current processes for the injection molding of plastic materials do not allow for making laboratory test tubes which have all the constructive peculiarities stated above, that is perfectly vertical side walls and constant thickness along the entire longitudinal extension of the test tubes themselves. Therefore, traditionally, to produce such test tubes, glass has always been used, which, with respect to plastic materials, can be processed with operatively more flexible molding processes and which is especially capable of providing final products with extreme dimensional tolerances.

The impossibility to use plastic materials in the production of this type of test tubes derives, firstly, from the operative difficulties encountered in keeping the male perfectly aligned and centred within the mold during the molding process and, secondly, from the difficulties encountered in expelling air from the mold during the injection step of the melted plastic material.

More in detail, the difficulties of centring the male within the mold are a consequence of the fact that the dimensions of the male are bound to those of the test tubes to be made (internal diameter of about 6-7 mm, wall thickness of about 1 mm and length of about 11-12 cm). The male is particularly slender and therefore it is not sufficiently strong and rigid to stand the high molding pressures requested (in the order of 100 bar) in the case of the molding of plastic materials without undergoing bending relative to the central axis of the mold. This would inevitably lead to have plastic test tubes with inclined side walls and with non-constant thickness.

This problem is emphasized, moreover, by the fact that, in order to ease the expulsion of all the air present in the mold, the melted plastic material is injected in the mold preferably at the bottom of the test tube. In fact, with an injection from the bottom, the air is pushed toward the mouth of the test tube where it can easily come out without special air-expellers. Therefore, there is the advantage of having a mold which is constructively simple to make and operatively reliable. However, in this way, the injection pressures of higher intensity are exerted just at the free end of the male, that is in the area where the latter is less rigid and is more easily subject to bending.

To limit the bending of the male, the plastic material can be injected in the mold at the mouth or possibly along the longitudinal extension axis of the test tube. With this solution, the injection pressures are exerted in areas where the male is more rigid. However, the air contained inside the mold is pushed, at least partially, in the molding area corresponding to the bottom of the test tube. Therefore, it necessary to provide, in the mold, a set of expellers to allow the evacuation of the air and prevent it from being trapped as bubbles inside the plastic matrix. In fact, considering the reduced thicknesses of the test tube's walls, the presence of air bubbles could generate micro pores capable of compromising the impermeability of the test tube, which would then become totally unusable.

From an operative point of view, this second solution requires therefore providing a constructively much more complicated mold compared to the one requested for the injection from the bottom. Moreover, this second solution, even though it partially solves the problem of the centring of the male, is quite unreliable. In fact, it is known in the art that the air expellers currently used are frequently obstructed and need a continuous maintenance which is particularly time consuming, which is unaffordable in large scale productions.

SUMMARY OF THE INVENTION

In this situation, therefore, the object of the present invention is to eliminate the drawbacks of the above-mentioned known art, providing an injection molding process that allows making laboratory test tubes in plastic material with improved characteristics.

A further object of the present invention is to provide a process for the injection molding which allow making plastic test tubes with perfectly vertical side walls and with a constant thickness along their entire longitudinal extension.

Another object of the present invention is to provide a molding process that is both cheap and easy to realize.

A further object of the present invention is to provide a mold usable in such molding process that allows a perfect centring of the male and a complete expulsion of the air without using traditional expellers.

These and other aims are all reached using an injection molding process and a mold usable in such process according to the appended claims.

BRIEF DESCRIPTION OF THE DRAWINGS

The technical characteristics of the invention, according to the above-mentioned purposes, can be clearly checked from the content of the following claims and the advantages of the same will be more evident in the detailed description which follows, made in reference to the drawings attached, which represent one or more merely illustrative and not limiting embodiments thereof, wherein:

FIGS. 3 and 3a show a plan view of a detail of the mold of FIG. 1 concerning first support base;

FIG. 4 shows a section view of the first support base of FIG. 3 along the section line IV-IV of the same figure;

FIG. 5 shows a perspective view of the first support base of FIG. 4 sectioned along line V-V of FIG. 4;

FIGS. 6 and 6a show a plan view of a detail of the mold of FIG. 1 related to a second support base;

FIG. 7 shows a section view of the second support base of FIG. 6 according to the section line VII-VII of the same figure;

FIG. 8 shows a perspective view of the second support base of FIG. 6 sectioned along the section line VIII-VIII of FIG. 7;

FIG. 12 shows a plan view of the bottom portion of the mold according to the invention in the assembled configuration;

FIG. 12a shows a section view of the bottom portion of FIG. 12 according to the section line A-A of the same figure;

FIG. 12b shows a section view of the bottom portion of FIG. 12 according to the section line B-B of the same figure;

FIG. 13 shows a plan view of the bottom portion like FIG. 12 with second wedges in a rest position, where some parts are shown not in scale, with dimensions exaggerated for illustration reasons, and other parts are not shown for sake of clarity;

FIG. 13a shows a detail of the FIG. 13 related to a second wedge coupled to two adjacent first wedges forming the bottom portion of the mold according to a preferred embodiment of the invention;

FIG. 14 shows a plan view of the bottom portion like FIG. 12 with second wedges in an operative position, where some parts are shown not in scale, with dimensions exaggerated for illustration reasons and other parts are not shown for sake of clarity; and FIG. 14a shows a detail of the FIG. 14 related to a second wedge coupled to two adjacent first wedges forming the bottom portion of the mold according to a preferred embodiment of the invention.

DETAILED DESCRIPTION OF THE INVENTION

Figure 1:
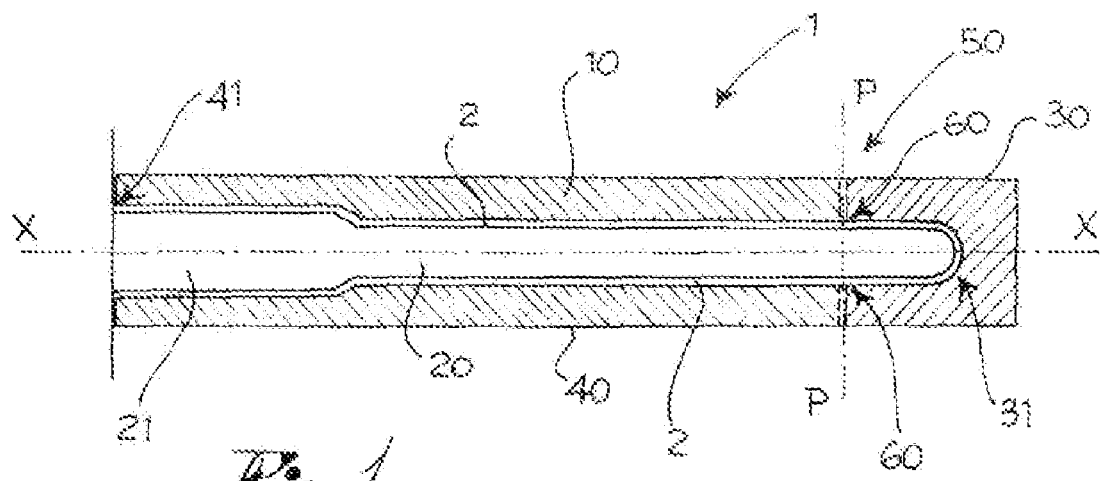
FIG. 1 shows a side schematic view of a forming mold according to the invention.

The process for the injection molding of plastic material, subject of the present invention, can be advantageously used in the production of laboratory test tubes, pipettes and like containers in plastic material, intended in general to clinical use, which require perfectly vertical side walls having a constant thickness along the entire longitudinal extension of the test tubes themselves.

In particular, this molding process can, therefore, be employed in the production laboratory test tubes in plastic material suitable to be employed in clinical tests to measure a blood sample's erythrocyte sedimentation rate (ESR). Furthermore, the molding process, subject of the present invention, allows solving the problem of evacuating the air from the mold without having to use traditional type expellers.

Advantageously, this molding process can use any plastic material suitable for medical use such as, for example, polyethylene terephthalate (PET), polyethylene (PE), polypropylene (PP), polyvinyl chloride (PVC), polystyrene, and methacrylate.

The first operative step of the process according to the present invention is a step a) of prearranging at least one mold 1 for forming a laboratory test tube.

This mold 1 comprises a female element 10 internally hollow and a male element 20 insertable inside the female element 10 to define a suitable forming chamber 2 for a laboratory test tube. As it can be seen in FIG. 1, this forming chamber 2 has a main longitudinal extension along a central axis X. The shape of the forming chamber 2 can be of any type, depending on the needs.

As will be explained further in detail describing the mold 1 which is subject of present invention as well, the female element 10 comprises at least a bottom portion 30, intended to shape the bottom of the test tube, and a head portion 40, intended to shape the main body of the test-tube itself.

The head portion 40 has an inlet mouth 41, which corresponds to the mouth itself of the test-tube, to allow the insertion of the male element 20 into the female element 10.

The bottom portion 30 comprises a cap 31 shaping the bottom of the tube test. Preferably the cap 31 is substantially hemispherical, as shown in the attached Figures.

According to an essential aspect of the present invention, the bottom portion 30 is formed by a number of first 100 and second counter-shaped radial wedges 200, which alternate and couple one with the other at radial interface zones 300.

At least each second wedge 200 is susceptible to move elastically in radial direction with respect two adjacent first wedges 100 from a rest position, in which the second wedge 200 abuts with interference onto both adjacent first wedges 100 at said interface zones 300 (see for example FIGS. 13 and 13a), to an operative position, in which the second wedge 200 is pushed outwards distancing itself from the two adjacent first wedges 200 such to create a gap 301 in correspondence of each interface zone 300 (see for example FIGS. 14 and 14a). Each gap 310 defines a slit 70 which is open on the forming chamber 2 and puts in fluidic communication the forming chamber 2 with the outside of the mold 1.

As shown in particular in FIGS. 13 and 13a, in the rest position the wedges contact one with the other at the interface zones 300 with interference contact. Therefore no gap exists at the interface zones 300 for the melted plastic material and/or the air to pass through.

As will be further described in detail, the second wedges 200 move from the rest position to the operative position under pressure of the melted plastic material injected into the forming chamber 2.

According to a preferred embodiment of the invention, only the second wedges 200 are susceptible to move elastically in radial direction outwards from said rest position (in which no gap exists between the wedges) to the operative position (in which gaps arise between the wedges). As will further described in detail, the first wedges 100 are fixed.

According to an alternative embodiment (not illustrated in the attached Figures), both the second wedges 200 and the first wedges 100 are susceptible to move elastically in radial direction outwards from the rest position to the operative position.

After the above-mentioned step a) of prearranging the mold 1, the molding process comprises a step b) of inserting the male element 20 into the female element 10 along the above-mentioned central axis X.

At this point of the process, the forming chamber 2 is prepared and it is possible then to proceed with a step c) of injecting the melted plastic material into the mold 1.

In the injecting step c), the plastic material, previously melted in an appropriate melting chamber, is introduced under pressure in the forming chamber 2 by means of a number of injection points 60 made on the female element 10 between the bottom portion 30 and the head portion 40.

Under the injection pressure the melted plastic material fills progressively the forming chamber 2 in order to obtain the test tube in a filling step d).

According to an essential aspect of the present invention, simultaneously to the filling step d), the molding process comprises:

a step e) of moving said first wedges from the rest position to the operative position under pressure of melted plastic material; and a step f) of progressively evacuating air contained in the forming chamber from the mold 1 under the pressure of the plastic material through the slits 70 created at the interface zones 300 between the first 100 and the second wedges 200.

Operatively, the slits 70 are adapted to permit the exit of air contained in the forming chamber under the pressure of melted plastic material that progressively fills the forming chamber 2. The slits 70 has dimensions sufficient to permit the passage of the air and at the same time block emission of the melted plastic material from the mold 1.

Preferably, the wedges are designed so that the gaps 301 and the slits 70 have a width between 0.005 and 0.02 mm, and preferably equal to 0.01 mm.

Advantageously, the movement of the second wedges 200 from the rest position to the operative position is not immediate with the starting of filling step d. In fact there is a delay between the filling step d and the moving step e due to the fact that the pressure in the forming chamber has to exceed a threshold before the wedges being elastically bent outwards. Therefore, while progressively filling the forming chamber, the melted plastic has time enough to cool down and increase its viscosity (even though still in melted state), if compared with the conditions in the melting chambers, before the second wedges 200 being moved to the operative position and the slit being created. Slit dimensions being equal, the more the viscosity of the melted plastic material increases, the more the risks of emissions or leakages of melted material reduce.

This is particularly advantageous from an operational point of view since it allows to reduce production idle times. As is known, in traditional injection molding processes, when the plastic material to be injected in the forming chamber results to be overheated (for example, because it has remained inside the melting chamber too time due to an interruption of the molding machine), it has to be discharged from the mold, otherwise it certainly enters the air expellers obstructing them, due to its very low viscosity if compared with the ideal injection conditions.

Contrary to traditional injection molding processes, the present invention allows to overcome this drawback without discharging the material and idle times. The melted plastic material can be injected in the forming chamber even if it is overheated. The little delay of the moving step with respect to the injection and filling steps leaves the melted plastic material time enough to cool down before the silts being created. Therefore, when the slits are created, the melted plastic material is sufficiently viscous not to enter the slits.

The Applicant experienced that even after a great number of production cycles melted plastic material has never obstructed the slits 70 using the mold 1 according to the present invention. The substantial absence of obstructions of the air vent (i.e. the slits) by the plastic material improves considerably the injection molding process from a operational point of view, in terms of reduction of idle times and maintenance costs.

After the plastic material has been completely solidified, subsequently to the filling, moving and evacuation steps, the process according to the invention comprises a step g) of extracting the male element 20 from the female element 10 and a step h) of removing the test tube from the mold 1.

Once the molded test tube has been removed from the mold the second wedges 200 return elastically from the operative position to the rest position. Then the mold 1 is ready for a new molding cycle.

Preferably, the slits 70 are open on the forming chamber for all the axial length of the wedges and cover at least the bottom portion from the injection points 60 to a bottom of the forming chamber 2 (for example, the hemispherical cap 31).

Advantageously, the above-mentioned slits 70 can extend themselves for the entire longitudinal extension of the female element 20 along the central axis X, as well as limit themselves to some segments, provided that at least the bottom portion 30 is covered.

In fact, during the evacuation step, the air contained inside the forming chamber 2, in the segment comprised between the inlet mouth 41 and an intermediate portion 50 in which the injection points 60 are made, tends naturally to come out from the mold 1 at the inlet mouth itself. Therefore, in this segment of the forming chamber 2 the slits 70, though facilitating the evacuation of the air, can also not be present. On the other hand, the air contained inside the forming chamber 2, in the segment comprised between the above-mentioned intermediate portion 50 and the bottom portion 30, cannot come out from the inlet mouth 41, the passage being obstructed by the melted plastic material, and has as a single escape route only the slits 70.

According to a preferred embodiment, each of the above-mentioned slits 70 extends with a first segment 71 starting from the intermediate portion 50 in which the injection points 60 are made, to proceed then with a second segment 72 in the cap 31 of the bottom portion 30. Preferably, the first segment 71 is substantially rectilinear and parallel to the central axis X and continuously connects with the second segment 72, which is substantially curvilinear and converging toward the N pole of the cap 31, to form a continuous slit.

According to a preferred embodiment shown in FIGS. 13 and 13*a*, in the rest position each second wedge 200 projects inwards inside the forming chamber 2 protruding with respect to the respective adjacent first wedges 100.

When pushed to operative position (see FIGS. 14 and 14*a*) each second wedge 200 results to be aligned with the respective two adjacent first wedges 100 such to create a continuous outer surface for the forming chamber 2. In this manner, during the final phases of the molding process, when the melted plastic material is solidifying, the forming chamber 2 assumes the shape adapted to the test tube to be molded, without steps being created on the outer surface of the test tube in correspondence of the second wedges 200.

As previously mentioned, during the injection step, the melted plastic material is introduced under pressure into the forming chamber 2 through side injection points 60.

The male element 20 is kept centred inside the female element 10 and aligned with respect to the central axis X by the melted plastic material introduced under pressure inside the forming chamber 2 through the side injection points 60.

The side injection points 60 are made in the female element 10 in an intermediate portion 50 comprised between the inlet mouth 41 and the bottom portion 30. The injection points 60 may be coplanar, lying on a same plane p substantially orthogonal relative to the central axis X, or they can lie on different parallel planes p substantially orthogonal relative to the central axis X.

According to the embodiment shown in FIG. 3, the side injection points 60 are made as pairs of opposite points with respect to the central axis X. Each pair's injection points lie substantially on the same orthogonal plane p. Preferably, all the injection points are made on the same orthogonal plane p.

Preferably, the side injection points 60 are radially distributed with respect to the central axis X at regular angular distances. For example, three injection points can be provided, mutually distributed with an angular distance of about 120°.

Advantageously, the side injection points 60, irrespective of how they are distributed inside the female element 10, are defined by nozzles orthogonally oriented with respect to said central axis X, to allow the melted plastic material to enter under pressure the forming chamber 2 during the injection step according to injection directions Y orthogonal relative to the central axis X. Thanks to this distribution of the nozzles, the male element 20 is subjected to an overall balanced system of forces which provides for a perfect centring of the male element 20 itself along the above-mentioned central axis X during the molding of the test tube.

According to alternative embodiments (non illustrated in the attached Figures), the centring of the male element 20 can also be obtained by orienting the nozzles of the side injection points 60 at angles which are non-right with respect to the central axis X. In this case, the nozzles are not coplanar with the plans p in which the various injection points 60 lie, but they lie on inclined planes. These alternative solutions, however, even though they allow centring of the male, have the disadvantage of originating a not perfectly homogenous injection of the melted plastic material inside the forming chamber 2.

Advantageously, thanks to the above-mentioned even distribution of the injection points 60, either equi-distanced or in pairs of opposed points, during the filling step, the male element 20 is kept centred inside of the female element 10 and aligned to the central axis X of the forming chamber 2 by the uniformly distributed pressure of the melted plastic material introduced inside the forming chamber 2 through the above-mentioned injection points 60.

As already mentioned before, an object of the present invention is a mold for the forming of laboratory test tubes by injection of plastic material, usable especially in the molding process just described. The basic characteristics of the mold 1 have already been anticipated by describing the molding process according to the invention. With reference to the attached figures, a preferred embodiment of such mold will be described, therefore, keeping the numeral references already used before.

As it can be observed in FIG. 1, the male element 20 of the mold 1, consists of a tubular body having a main longitudinal extension along the above-mentioned central axis X. The male element 20 is connected to a first support structure (not shown) at its base portion 21. Preferably, at this base portion 21, the male element 20 shows an increased cross-section such that the bending resistance along the central axis is increased.

The female element 10 is housed inside a second support structure (not shown) inside which a number of heated injection channels 80 are made, which communicate with the side injection points 60 to convey the melted plastic material from a melting chamber (not shown) to the forming chamber 2.

More in detail, the female element 10 consists of two distinct hollow bodies, which are assembled before the molding to define the test tube's external extension surface. A first hollow body corresponds to the above-mentioned head portion 40 and defines the shape of the test tube for the segment extending from the mouth of the test tube itself to the end of the graduated area, while the second hollow body corresponds to the above-mentioned bottom portion 30 and defines the shape of the test tube for the segment extending from the end of the graduated area to the bottom of the test tube.

As it can be seen in FIG. 1 the interface area between these two hollow bodies 30 and 40 of the female element 10 defines the above-mentioned intermediate portion 50 where the side injection points 60 lie and is defined by a plane p orthogonal to the central axis X.

Preferably, this plane p is located immediately below the test tube's graduated reading area so to avoid that the graduated area is deteriorated by the presence of the traces of the injection points.

As already mentioned before, according to alternative solutions not shown in the attached Figures, the injection points 60 may lie on different planes orthogonal to the central axis X. In this case, the interface area between these two hollow bodies 30 and 40 of the female element 10 is no longer a single substantially flat surface but it is rather a surface with steps (straight or ramp shaped) defined by the several plans orthogonal to the central axis X (parallel to each other) in which the injection points lie.

According to the preferred embodiment shown particularly in FIGS. 5 and 14, the bottom portion 30 is formed by a number of first 100 and second counter-shaped radial wedges 200, which alternate and couple one with the other at radial interface zones 300.

The radial interface zones 300 are the areas in which the lateral flat walls 102 and 201 of two adjacent wedges face one with the other, these lateral walls 102 and 202 lying on radial planes with respect the central axis X.

According to the invention, each second wedge 200 is susceptible to move elastically in radial direction with respect two adjacent first wedges 100 under the pressure of the melted plastic material injected into the forming chamber from a rest position, in which (without said pressure) the second wedge 200 abuts with interference onto both adjacent first wedges 100 at said interface zones 300 (see for example FIG. 13), to an operative position, in which (under said pressure) the second wedge 200 is pushed outwards distancing itself from the two adjacent first wedges 200 such to create a gap 301 in correspondence of each interface zone 300 (see for example FIG. 14). Each gap 310 defines a slit 70 which is open on the forming chamber 2 and puts in fluidic communication the forming chamber 2 with the outside of the mold 1.

Functionally, each second wedges 200 operate as a venting valve, which open when the pressure inside the forming chamber exceeds a threshold value.

As shown in FIG. 12, the bottom portion 30 comprises a hemispherical cap section 31 and a tubular rectilinear section 32. Each wedge 100 and 200 extends to both said two sections.

As will further described in detail, in the rest position, each slit 70 presents at least a first segment 71, substantially rectilinear, corresponding to the tubular rectilinear section 32 and a second segment 72, substantially curvilinear, converging towards the pole N of the cap 31.

Figure 9:
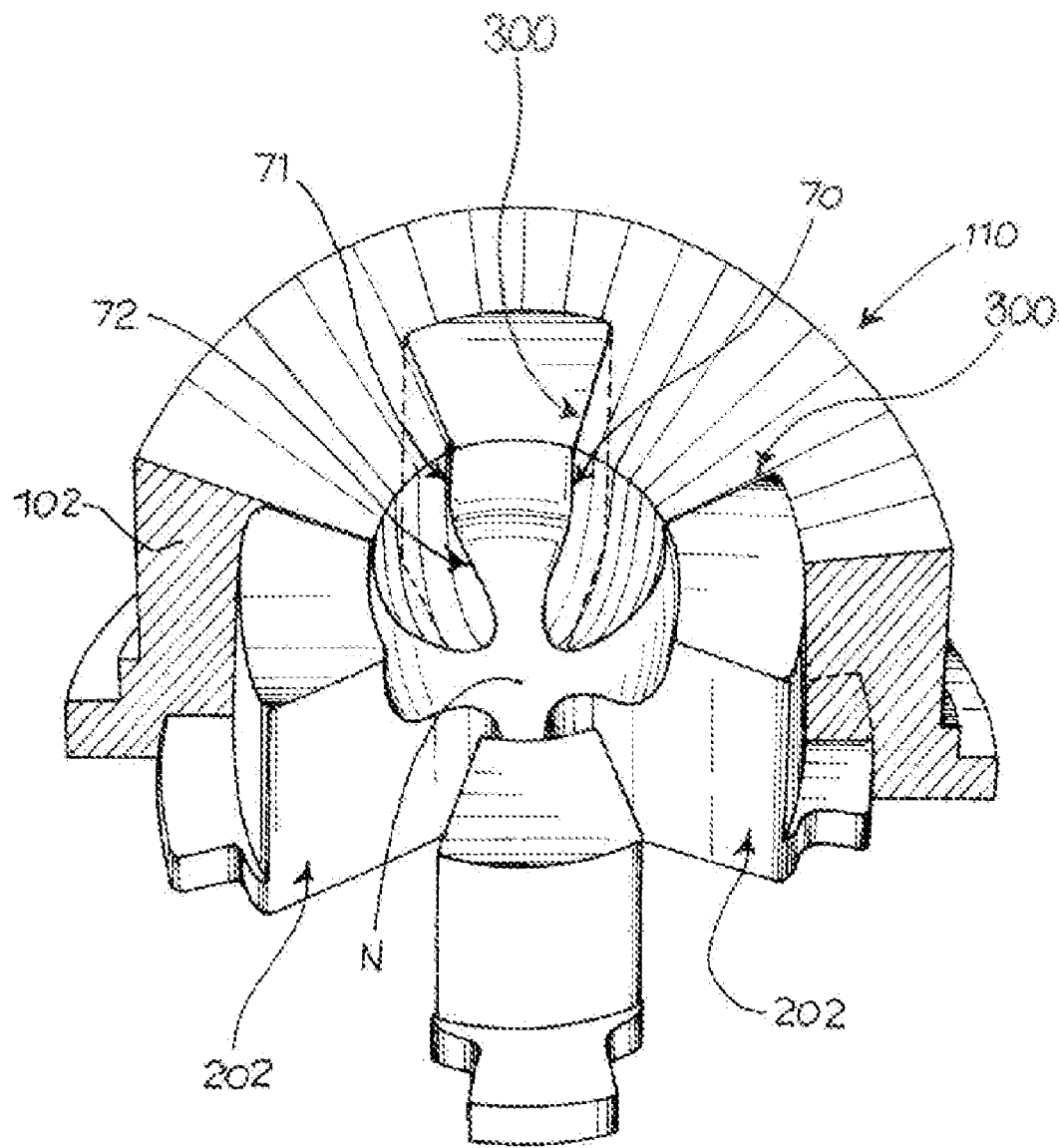
FIG. 9 shows a perspective view of the first and of the second support base of FIGS. 5 and 8 in an assembled condition, with some parts removed to better highlight others.

According to a preferred embodiment shown in particular in FIGS. 5 and 9, the first wedges 100 are connected to a first support base 110 along their axial extension in order not to be subjected to movements under the pressure of the melted plastic material injected into the forming chamber.

The first wedges 100 define with the first support base 210 a number of axial seats 112, one for each second wedge 200.

More in detail, as shown in particular in FIGS. 4 and 5, the first support base 110 consists of a cylindrical body, which is coaxially provided with an internal shaped cavity 111. Inside this cavity 11, four first wedges 100 (having a main longitudinal extension parallel to the central axis X) radially project and delimit four axial seats 112.

Each first wedge 100 is delimited by two lateral radial walls 102 (both converging to the central axis X). The surface facing and delimiting the forming chamber 2 presents a concave part 103, which defines the corresponding sector of the hemispherical cap 31 and converges toward the latter's N pole, and a substantially flat part 104, which extends parallel to the central axis X up to the orthogonal plane p wherein the injection points 60 lie, to define (together with the second wedges 200) the corresponding sector of the bottom portion 30 connecting to the head portion 40 of the mold 1.

The second wedges 200 are cantilever elements connected to a second support base 210 only at one distal end in order to be free to elastically bending in radial direction inside the axial seats 112 delimited by the first wedges 200.

More in detail, according to the preferred embodiment shown in FIGS. 7 and 8, the second support base 210 consists of a flat body 212 from which four arms 213 project radially at 90°. From each arm 213 a second wedge 200 extends substantially parallel to the central axis X as a cantilever element. The four second wedges 200 connect to each other at the pole N of the hemispherical cap 31, that is at the second support base. The shape of the second wedges 200 in correspondence of the surface facing and delimiting the forming chamber 2 is substantially similar to the one of the first wedges 100.

Preferably, as shown in FIGS. 13 and 13a, in the rest position each second wedge 200 projects inwards inside the forming chamber 2 protruding with respect to the respective adjacent first wedges 100. Therefore, in the rest position each second wedge 200 extends from the second support base 210 slightly inclined inwards with respect to the central axis X.

According to embodiment shown in FIGS. 12 and 14, the second wedges 200 protrude with respect to the respective adjacent first wedges 100 about 0.01 and 0.04 mm (see distance H in FIG. 13a), and preferably about 0.02 mm, in correspondence of the plane p in which the injection points 60 lie, this plane p being positioned at about 15 mm from the pole N of the hemispherical cap 31 of the bottom portion 30.

Preferably, when pushed to operative position (see FIGS. 14 and 14a) each second wedge 200 results to be aligned with the respective two adjacent first wedges 100 such to create a continuous outer surface for the forming chamber 2. In this manner, during the final phases of the molding process, when the melted plastic material is solidifying, the forming chamber 2 assumes the shape adapted to the test tube to be molded, without steps being created on the outer surface of the test tube in correspondence of the second wedges 200.

As shown in FIGS. 9 and 12, the two support bases 110 and 210 are suitably shaped so to be mutually fit coupled thus forming a single body, the first wedges 100 alternating in coupling with the wedges 200. The air leaving the forming chamber 2 exit to outside passing through the slits 70 and the air clearances existing between the two support bases 110 and 210 coupled together.

The second support base 210 is placed at distal position with respect to the head portion 40 of the mold 1, in correspondence of the hemispherical cap 31. The second wedges 200 extends towards the head portion 40.

The radial interface zones 300 between the wedges 100 and 200 are the areas in which the lateral flat walls 102 and 201 of two adjacent wedges face one with the other. These lateral walls 102 and 202 lying on radial planes with respect the central axis X.

Preferably, these walls 102 and 202 have a surface roughness defined as Ra in the range between $0.4 \cdot 10^{-6}$ m and $6.3 \cdot 10^{-6}$ m. This surface roughness defines, between the two walls, a thick network of micro channels that allow the free passing of the air, though preventing, at the same time, the leaking of melted plastic material, when the second wedges are in the operative positions and gaps 301 are created.

Preferably, in the operative position each slit 70 has a width L in the range between 0.005 and 0.02 mm, and preferably equal to 0.01 mm.

Figure 2:
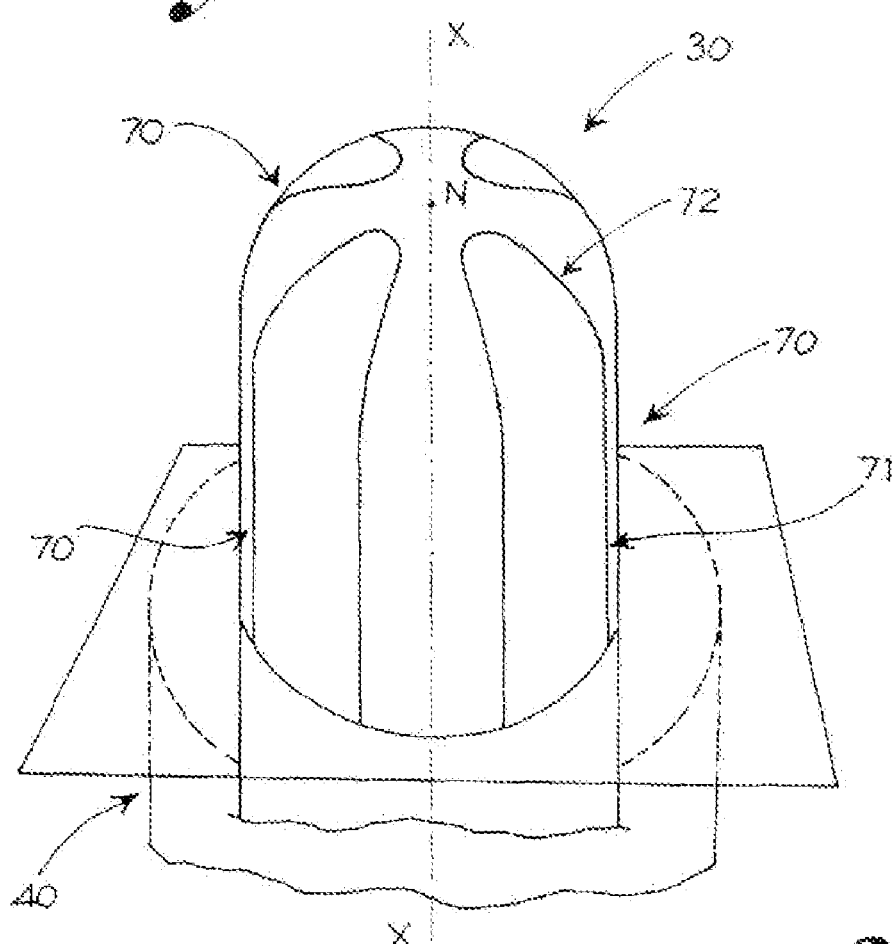
FIG. 2 shows a perspective view of a detail of the mold of FIG. 1 concerning the extension of slits for the evacuation of the air according to a preferred embodiment.

According to the preferred embodiment shown in the attached figures, there are eight slits 70 for the evacuation of the air which follow the profile of the wedges 100 and 200. The first segment 71 of each slit follows the edge of the flat part 104 of the wedges, while the second segment 72 follows the edge of the concave part 103 of the wedges. The extension of these slits 70 can be appreciated in the FIG. 2, wherein for the sake of clarity, only the surface extension of the bottom portion 30 is shown without illustrating the real thickness of the external containment walls.

The overall extension of the slits 70 thus defined, allows to obtain large active evacuation surfaces and difficult to obtain by using, instead, traditional type expellers.

In fact, for a mold 1 according to the invention in which the distance between the pole N of the cap 31 and the plane p of the injection points has been established to be equal to about 15 mm, the overall evacuation surface provided by the 8 slits is $2.4 \text{ mm}^2$, considering, for each slit, an air gap L of 0.02 mm. This surface is equal to the one of a circular hole having a diameter of about 1.76 mm.

Traditionally, an evacuation surface of these sizes can be realised only by providing in the bottom of the mold a high (and constructively impossible) number of expellers, with the disadvantage of not having a distributed evacuation surface, but a surface in any case concentrated in a few points.

Figure 10:
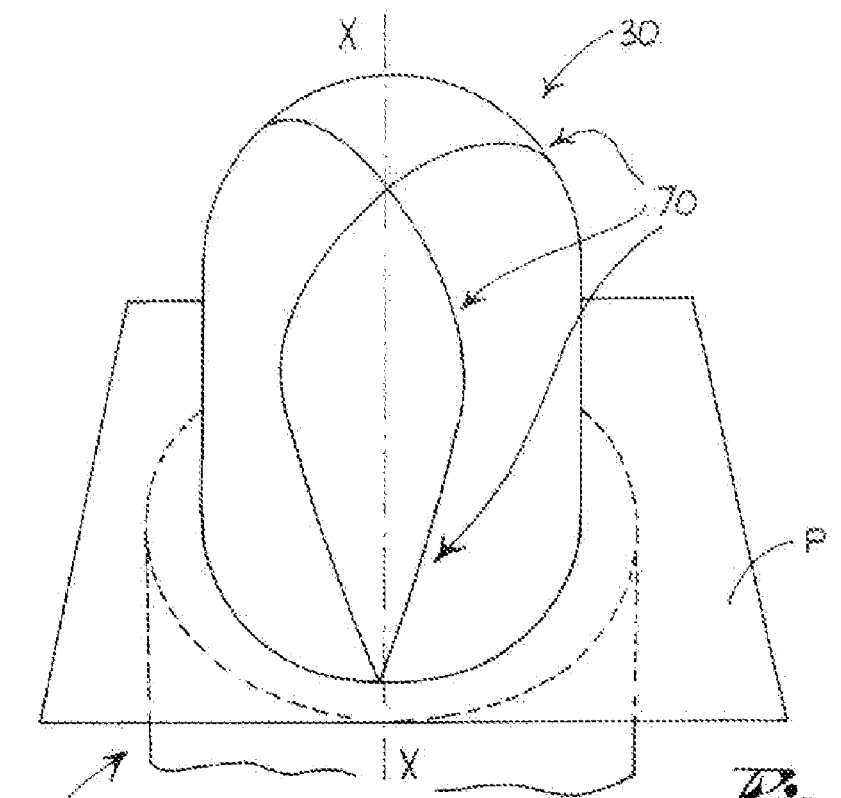
FIGS. 10 and 11 show two perspective views of a detail of the mold of FIG. 1 concerning the extension of slits for the evacuation of the air according to two different alternative embodiments.
Figure 11:
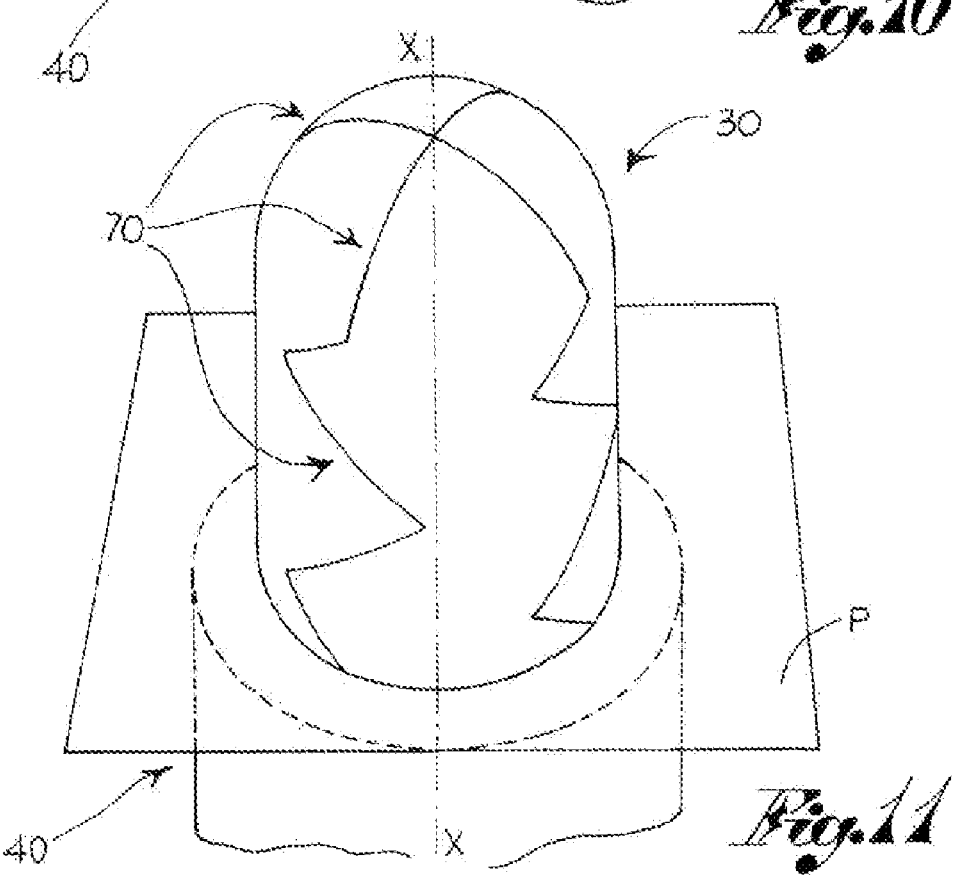

The scope of protection is not limited to the shapes of the slits 70 just described, but it extends to any shape useful to carry out the role of these slits 70, that is to progressively expel the air during the filling step of the mold 1. In fact, for example, there can be foreseen slits 70 which intersect, which follow a broken or inclined line with respect to the central axis X or which have a wavy pattern. In FIGS. 10 and 11 some alternative solutions are shown for the forming of the slits 70, with oblique lines and broken lines, respectively.

As it can be observed in detail in the FIGS. 3 and 3a, the injection points 60 are made in the first support base 110, at each of the first wedges 100. The injection points 60 are four, radially arranged relative to the central axis X and spaced angularly at 90° the one from the other so as to result opposite in pairs. The injection points 60 are defined by nozzles orthogonally oriented relative to the central axis X to allow the plastic material to enter the forming chamber 2 according to directions Y of injection orthogonal to the central axis X and to allow, thus, the centring of the male element 20 inside the female element 10.

More in detail, as can be observed in FIG. 3, the melted plastic material is conveyed to the various nozzles through a network of injection channels 80 which branch out from a delivery collector (not illustrated) by means of a series of bifurcations. This constructive solution allows the achievement of a balanced injection thus obtaining the same injection pressure in each nozzle.

I claim:

1. An injection molding process of the plastic material for making laboratory test tubes comprising steps of:
    prearranging at least one mold comprising a forming chamber which extends along a central axis and is defined by a female element and a male element, said female element comprising a head portion, in which an inlet mouth has been made for said male element, and a bottom portion formed by a number of first and second counter-shaped radial wedges, which alternate and couple one with the other at radial interface zones, at least each second wedge being susceptible to move elastically in radial direction with respect two adjacent first wedges from a rest position, in which it abuts with interference onto both adjacent first wedges at said interface zones, to an operative position, in which it is pushed outwards distancing itself from the two adjacent first wedges such to create a gap in correspondence of each interface zone, which defines a slit putting in fluidic communication said forming chamber with the outside;
    inserting said male element inside said female element along said central axis;
    injecting said melted plastic material under pressure into said forming chamber through a number of injection side points made on said female element between said bottom portion and said head portion,
    progressively filling said forming chamber with said plastic material to obtain said test tube; while simultaneously
    moving said first wedges from the rest position to the operative position under pressure of melted plastic material and
    evacuating air contained in said forming chamber progressively from said mold under the pressure of said plastic material through the slits created at the interface zones between said first and second wedges, said slits being adapted to permit the exit of air contained in the forming chamber under said pressure and having dimensions sufficient to permit the passage of the air and at the same time block emission of said melted plastic material from said mold;
    extracting said male element from said female element; and
    removing said test tube from said mold.

2. A molding process according to claim 1, wherein in said rest position each second wedge projects inwards inside the forming chamber protruding with respect to the respective adjacent first wedges and in said operative position each second wedge is aligned with the respective two adjacent first wedges such to create a continuous outer surface for said forming chamber.

3. A molding process according to claim 1, wherein said slits are open on said forming chamber for all the axial length of said wedges and cover at least said bottom portion from said injection points to a bottom of said forming chamber.

4. A molding process according to claim 1, wherein each of said slits has a width between 0.005 and 0.02 mm.

5. A molding process according to claim 1, wherein said male element is kept centred inside said female element and aligned with respect to said central axis by said melted plastic material introduced under pressure inside said forming chamber through said side injection points.

6. A molding according to claim 5, wherein said side injection points are made on said female element as pairs of points, opposite with respect to said central axis, the two opposite injection points of each pair substantially lying on a plane orthogonal to said central axis.

7. A molding process according to claim 5, wherein said side injection points are defined by nozzles oriented orthogonally with respect to said central axis to permit said melted plastic material during said injection step to enter into said forming chamber along injection directions which are orthogonal with respect to said central axis.

8. A molding process according to claim 1, wherein during said evacuation step the air contained inside said forming chamber in said head portion exits said mold mainly at mouth, while the air contained inside the said forming chamber in the bottom portion progressively exits from said mold through said slits.

9. A molding process according to claim 1, wherein the melted plastic cools down increasing its viscosity while progressively filling the forming chamber before moving said second wedges to said operative position.

10. A molding process according to claim 1, wherein said plastic material is chosen in the group comprising polyethylene terephthalate (PET), polyethylene (PE), polypropylene (PP), polyvinyl chloride (PVC), polystyrene and methacrylate.

11. A mold for the forming of laboratory test tubes by means of injection of melted plastic material, comprising
    a forming chamber extending along a central axis and defined by a female element and a male element, said female element comprising a bottom portion and a head portion, in which an inlet mouth has been made for said male element, several side injection points for said melted plastic material being made in said female element between said bottom portion and said head portion,
    wherein said bottom portion is formed by a number of first and second counter-shaped radial wedges, which alternate and couple one with the other at radial interface zones, at least each second wedge being susceptible to move elastically in radial direction with respect two adjacent first wedges under pressure of melted plastic material injected into the forming chamber from a rest position, in which without said pressure it abuts with interference onto both adjacent first wedges at said interface zones, to an operative position, in which under said pressure it is pushed outwards distancing itself from the two adjacent first wedges such to create a gap in correspondence of each interface zone, which defines a slit adapted to permit the exit of air contained in the forming chamber under said pressure and having dimensions sufficient to permit the passage of the air and at the same time block emission of said melted plastic material from said mold.

12. Mold according to claim 11, wherein in said rest position each second wedge projects inwards inside the forming chamber protruding with respect to the respective adjacent first wedges and in said operative position each second wedge is aligned with the respective two adjacent first wedges such to create a continuous outer surface for said forming chamber.

13. A mold according to claim 11, wherein said second wedges are cantilever elements connected to a support base only at one distal end in order to be free to elastically bending in radial direction.

14. A mold according to claim 11, wherein the first wedges are connected to a first support base along their axial extension in order not to be subjected to movements under said pressure, said first wedges defining with said first support base a number of axial seats, one for each second wedge, said second wedges being cantilever elements connected to a second support base only at one distal end in order to be free to elastically bending in radial direction inside said axial seats.

15. A mold according to claim 11, wherein said slits are open on said forming chamber for all the axial length of said wedges and cover at least said bottom portion from said injection points to a bottom of said forming chamber.

16. A mold according to claim 11, wherein each of said slits has a width between 0.005 and 0.02 mm.

17. A mold according to claim 11, wherein in correspondence of the interface zone each wedge has a wall having a surface roughness defined as Ra between $0.4 \times 10^{-6}$ m and $6.3 \times 10^{-6}$ m.

18. A mold according to claim 11, wherein said side injection points are made on said female element as pairs of points, opposite with respect to said central axis, the two opposite injection points of each pair substantially lying on a plane orthogonal to said central axis.

19. A mold according to claim 11, wherein said injection points are defined by nozzles oriented orthogonally with respect to said central axis to permit said plastic material to enter into said forming chamber along injection directions which are orthogonal to said central axis and thus to permit the centring of said male element inside said female element.

20. A mold according to claim 11, wherein said bottom portion comprises a tubular rectilinear section and a hemispherical cap section, each wedge extending to both said sections, each slit having at least a first segment, substantially rectilinear, corresponding to the tubular rectilinear section and a second segment, substantially curvilinear, converging towards the pole of said cap.

* * * * *